United States Patent
Jung et al.

(10) Patent No.: US 9,072,001 B2
(45) Date of Patent: Jun. 30, 2015

(54) METHOD FOR PERFORMING SELECTIVE MEASUREMENT IN WIRELESS COMMUNICATION SYSTEM AND DEVICE FOR SUPPORTING SAME

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 213 days.

(21) Appl. No.: 13/882,633

(22) PCT Filed: Nov. 1, 2011

(86) PCT No.: PCT/KR2011/008260
§ 371 (c)(1),
(2), (4) Date: Apr. 30, 2013

(87) PCT Pub. No.: WO2012/060615
PCT Pub. Date: May 10, 2012

(65) Prior Publication Data
US 2013/0223267 A1 Aug. 29, 2013

Related U.S. Application Data

(60) Provisional application No. 61/409,072, filed on Nov. 1, 2010.

(51) Int. Cl.
| | | |
|---|---|---|
| *H04L 1/00* | (2006.01) | |
| *H04L 12/26* | (2006.01) | |
| *H04L 12/28* | (2006.01) | |
| *H04W 24/10* | (2009.01) | |
| *H04J 11/00* | (2006.01) | |
| *H04W 72/08* | (2009.01) | |
| *H04W 24/02* | (2009.01) | |

(52) U.S. Cl.
CPC ............. *H04W 24/10* (2013.01); *H04J 11/005* (2013.01); *H04W 24/02* (2013.01); *H04W 72/082* (2013.01); *H04J 2211/001* (2013.01)

(58) Field of Classification Search
CPC ......... H04L 47/10; H04L 43/50; H04L 41/12; H04L 45/02
USPC .................................................. 370/252, 254
See application file for complete search history.

(56) References Cited

U.S. PATENT DOCUMENTS

2012/0082052 A1* 4/2012 Oteri et al. .................... 370/252

FOREIGN PATENT DOCUMENTS

| KR | 10-2007-0074708 | 7/2007 |
| KR | 10-2008-0101185 | 11/2008 |
| KR | 10-2009-0095437 | 9/2009 |

* cited by examiner

*Primary Examiner* — Ronald B Abelson
(74) *Attorney, Agent, or Firm* — Lee, Hong, Degerman, Kang & Waimey

(57) ABSTRACT

Provided is a method which is performed by a user equipment in a wireless communication system. The method comprises the following steps: receiving from a serving cell a first measurement setting which is applied to normal operation; receiving from an interfering cell a second measurement setting when a high interference situation occurs; deciding whether the high interference situation has occurred; and performing the measurement based on the first measurement setting and the second measurement setting when the high interference occurrence is detected.

15 Claims, 12 Drawing Sheets

_US 9,072,001 B2_

METHOD FOR PERFORMING SELECTIVE MEASUREMENT IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2011/008260, filed on Nov. 1, 2011, which claims the benefit of U.S. Provisional Application Ser. No. 61/409,072, filed on Nov. 1, 2010, the contents of which are all hereby incorporated by reference herein in their entirety.

TECHNICAL FIELD

The present invention concerns wireless communications, and more specifically, to a method of performing measurement by sensing interference from a serving cell and other cells and selectively applying a limited measurement configuration in a wireless communication system and an apparatus supporting the method.

BACKGROUND ART $3^{rd}$ Generation Partnership Project (3GPP) Long Term Evolution (LTE), an evolution of UMTS (Universal Mobile Telecommunications System), is introduced as 3GPP release 8. 3GPP LTE adopts Orthogonal Frequency Division Multiple Access (OFDMA) for downlink and Single Carrier-Frequency Division Multiple Access (SC-FDMA) for uplink. Multiple Input Multiple Output (MIMO) is employed of having up to four antennas. Recently, an advanced version of 3GPP LTE, 3GPP LTE-advanced (LTE-A), is actively on discussion.

User equipment (UE), while being serviced from a specific cell, may be interfered by radio signals transmitted from another cell. User equipment periodically measures cells and reports a measurement result. In case user equipment performs handover to another cell, it may perform measurement on a neighboring cell as well as a serving cell and may report a result. In measuring the specific cell, interference caused by radio signals from other cells renders it difficult for the user equipment to normally measure the specific cell. This deteriorates mobility of the user equipment in the wireless communication system.

In particular, under the situation where macro cells, pico cells, and femto cells are co-existent, for example, when different service coverage, different frequency channel bands, and different RATs (Radio Access Technologies) serviced by cells, schemes for avoiding interference caused by the cells may be considered more critical.

Inter-cell Interference Coordination (ICIC) is a task that operates radio resources so as to maintain control of inter-cell interference. The ICIC mechanism may be divided into a frequency domain ICIC and a time domain ICIC. The ICIC includes multi-cell Radio Resource Management (RRM) functions that require consideration of information from multi-cells.

The frequency domain ICIC coordinates use of frequency domain resources (e.g., Resource Block (RB)) between multi-cells. The time domain ICIC coordinates time domain resources (e.g., subframe) between multi-cells.

In the ICIC, depending on targets for which the user equipment performs measurement, targets causing interference (i.e., interfering cell) and targets damaged by interference (i.e., interfered cell) are determined.

If user equipment approaches the coverage of a neighboring cell that cannot be accessed, the user equipment may be highly interfered. To prevent the situation where UEs inaccessible to the neighboring cell cannot perform communication due to interference caused by the neighboring cell, the neighboring cell may transmit and receive wireless signal transmission signals with measurement resources limited.

Meanwhile, in a communication environment with severe interference, a network may have a difficulty in transferring an optimal measurement configuration to the user equipment. The user equipment may apply a common measurement configuration in a normal environment and may apply another measurement configuration proper for an environment with severe interference in such severely interfered environment. However, whenever high interference occurs, receiving a report from the user equipment and transmitting another measurement configuration may cause signaling overhead. To address such problem, there is a need for a method of being able to sense a situation where the user equipment is going to vary the measurement configuration and accordingly may apply the varied measurement configuration on its own.

DISCLOSURE

Technical Problem

Technical objects of the present invention are directed towards a method of avoiding interference caused by a serving cell and another cell in a wireless communication system, in other words, a method of performing measurement by user equipment sensing a situation where high interference occurs and accordingly selectively applying a measurement resource limited configuration and an apparatus supporting the method.

Technical Solution

In an aspect, a method of performing measurement by user equipment in a wireless communication system is provided. The method comprises receiving, from a serving cell, a first measurement configuration applied to the measurement upon normal operation, receiving, from an interfering cell, a second measurement configuration applied to the measurement when high interference occurs, determining whether the high interference occurs, and performing the measurement based on a result of determining whether the high interference occurs, the first measurement configuration, and the second measurement configuration.

Performing the measurement may comprise, when the high interference occurs, measuring the serving cell and a neighboring cell including the interfering cell based on the second measurement configuration.

When the high interference does not exist, the serving cell and the neighboring cell including the interfering cell may be measured based on the first measurement configuration.

The method may further comprise reporting the measurement result to the serving cell, wherein if the measurement is performed based on the second measurement configuration, the measurement result includes information indicating that the measurement result is obtained based on the second measurement configuration.

The second measurement configuration may include a list of measurement object cells to which the second measurement configuration applies.

Performing the measurement may comprise, if the high interference occurs, measuring measurement object cells in the cell list based on the second measurement configuration, and measuring measurement object cells that are not included in the cell list based on the first measurement configuration.

The second measurement configuration may include a frequency list of measurement object cells to which the second measurement configuration applies.

Performing the measurement may comprise, if the high interference occurs, measuring a measurement object cell using a frequency included in the frequency list based on the second measurement configuration and measuring a measurement object cell using a frequency that is not included in the frequency list based on the first measurement configuration.

The second measurement configuration may include pattern information of an ABS (Almost Blank Subframe) that is a section where radio signal transmission by the interfering cell is minimized.

Determining whether the high interference occurs may comprise, when detecting a cell having the same identification information as identification information of a cell determined to be an inaccessible cell, determining that the high interference occurs.

Determining whether the high interference occurs may further comprise, when detecting the cell determined to be an inaccessible cell and a position of the user equipment and a current position of the user equipment are within a predetermined distance, determining that the high interference occurs.

Determining whether the high interference occurs may further comprise, if a value measured on the neighboring cell by the user equipment is not less than a predetermined first threshold value, determining that the high interference occurs.

Determining whether the high interference occurs further may comprise, if a physical layer cell identity of the neighboring cell is an identity reserved for a CSG (Closed Subscriber Group), determining that the high interference occurs.

Determining whether the high interference occurs may further comprise, if a difference between an RSRP measured value and an RSRQ measured value of the serving cell is not less than a predetermined second threshold value, determining that the high interference occurs.

Determining whether the high interference occurs may further comprise, if a measured value of the serving cell is not more than another predetermined third threshold value, determining that the high interference occurs.

In another aspect, an apparatus of performing measurement in a wireless communication system is provided. The apparatus comprises an RF (Radio Frequency) unit transmitting and receiving a radio signal and a processor connected to the RF unit, wherein the processor receives, from a serving cell, a first measurement configuration applied to the measurement upon normal operation, receives, from an interfering cell, a second measurement configuration applied to the measurement when high interference occurs, determines whether the high interference occurs, and performs the measurement based on a result of determining whether the high interference occurs, the first measurement configuration, and the second measurement configuration.

When the high interference occurs, the processor may measure the serving cell and a neighboring cell including the interfering cell based on the second measurement configuration.

When the high interference does not exist, the processor may measure the serving cell and the neighboring cell including the interfering cell based on the first measurement configuration.

Advantageous Effects

As described above, user equipment recognizes whether high interference occurs, and as necessary, autonomously selects and applies a measurement configuration or measurement resource limited configuration. Through this, the user equipment may perform limited measurement through low-interference radio resources, if necessary. Without separate signaling by the serving cell, the user equipment itself selectively uses the measurement configuration or measurement resource limited configuration. Accordingly, even when signaling of the serving cell is impossible due to high interference, the user equipment may conduct limited measurement. Further, since in the situation where high interference occurs to the user equipment a procedure such as measurement configuration request-measurement configuration response of the base station is omitted, excessive occupation of radio resources may be prevented.

Even while the serving cell is being interfered from other cells, the user equipment may maintain, through the limited measurement, the camping on status on the serving cell without experiencing a connection failure.

Even when the neighboring cell is being interfered from other cells, the user equipment may more correctly measure the neighboring cell by performing the limited measurement to fit the purpose of operation of the network. By doing so, the efficiency of the network may be enhanced in terms of mobility management of the user equipment and utilization of the radio resources.

MODE FOR INVENTION

Figure 1:
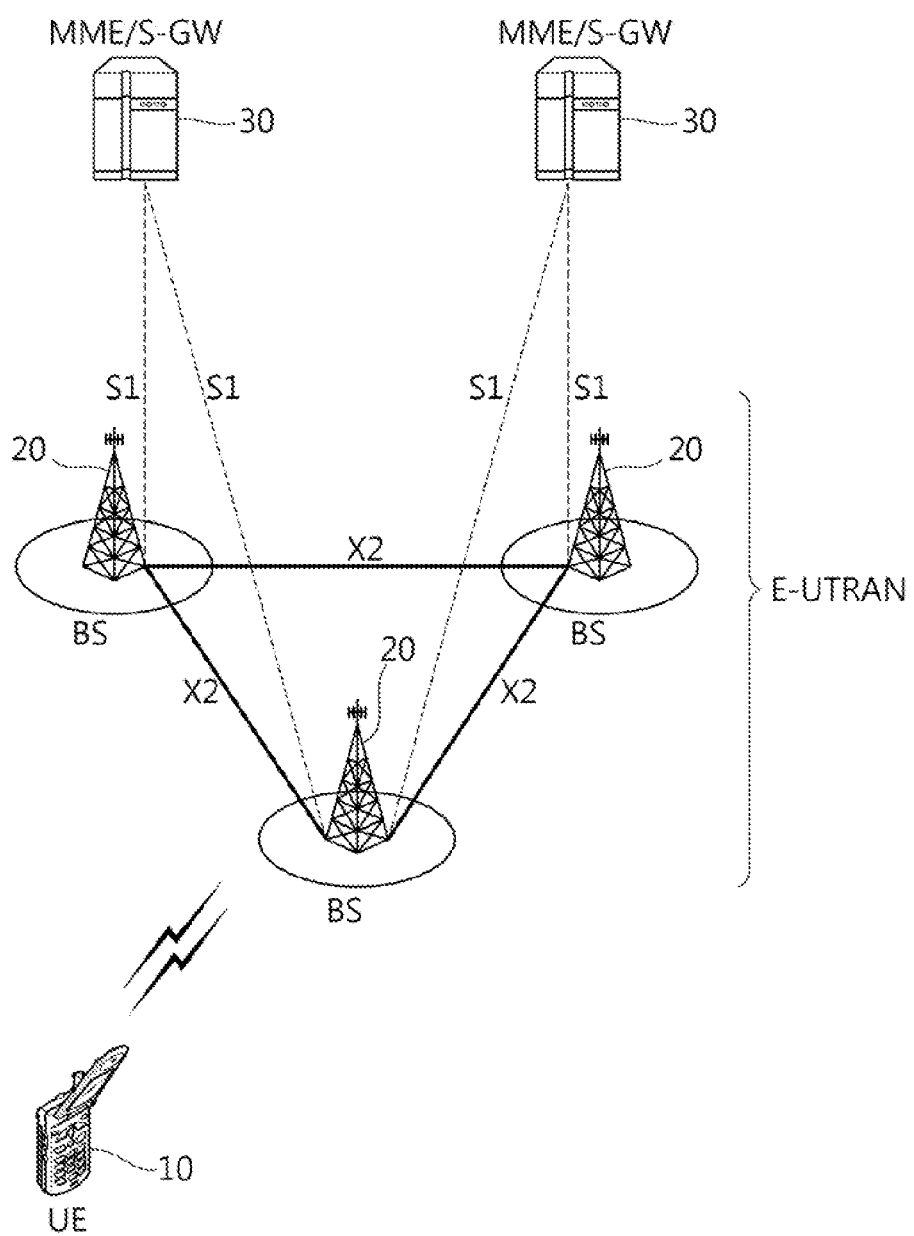
FIG. 1 shows a wireless communication system according to the present invention.

FIG. 1 shows a wireless communication system according to the present invention. This system may be also referred to as Evolved-UMTS Terrestrial Radio Access Network (E-UTRAN) or Long Term Evolution (LTE)/LTE-A system.

The E-UTRAN includes a base station (BS) 20 providing a control plane and a user plane to user equipment (UE) 10. The user equipment 10 may be stationary or mobile and may be also referred to by other terms such as Mobile Station (MS), User Terminal (UT), Subscriber Station (SS), Mobile Terminal (MT), or wireless device. The base station 20 is a fixed station communicating with the user equipment 10 and may be referred to by other terms such as evolved-NodeB (eNB), Base Transceiver System (BTS), or access point.

The base stations 20 may be connected to each other through an $X_2$ interface. The base station 20 is connected to an Evolved Packet Core (EPC) 30 through an S1 interface, more specifically, to an Mobility Management Entity (MME) through an S1-MME and to an Serving Gateway (S-GW) through S1-U.

The EPC 30 consists of an MME, an S-GW, and a Packet Data Network-Gateway (P-GW). The MME has access information of the user equipment or information on the capacity of the user equipment. Such information is mainly used for managing mobility of the user equipment. The S-GW is a gateway having E-UTRAN as its end point, and the P-GW is a gateway having PDN as its end point.

Layers of a radio interface protocol between the user equipment and the network may be divided into an L1 (first layer), an L2 (second layer), and an L3 (third layer) based on lower three layers of an open system interconnection (OSI) reference model well known in the communication system. Among them, the physical layer, which belongs to the first layer, provides an information transfer service using a physical channel, and the Radio Resource Control (RRC) layer positioned in the third layer controls radio resources between the user equipment and the network. For this, the RRC layer exchanges RRC messages between the user equipment and the base station.

Figure 2:
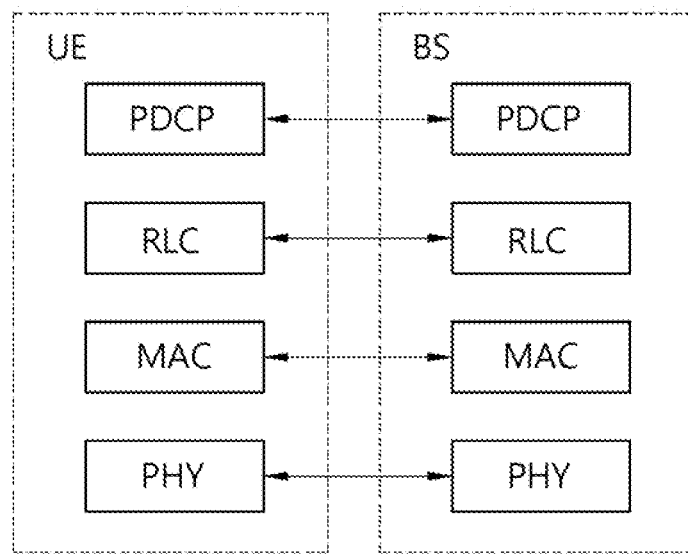
FIG. 2 is a block diagram illustrating a radio protocol architecture for a user plane.
Figure 3:
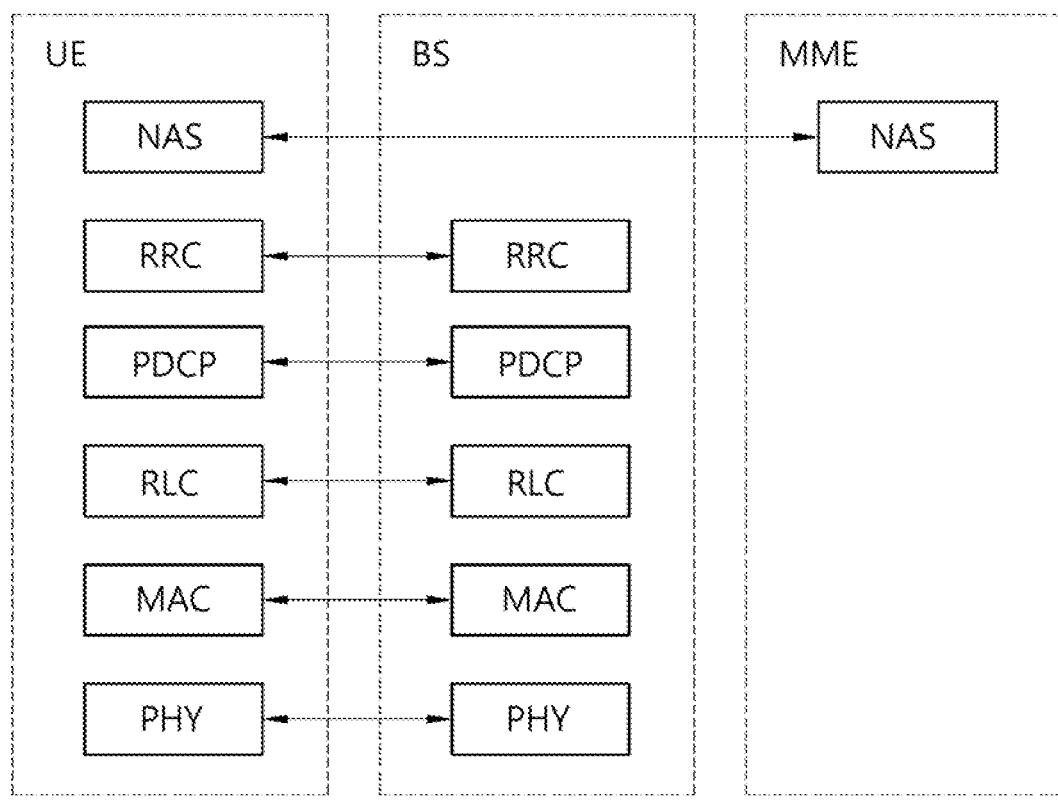
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The data plane is a protocol stack for user data transmission, and the control plane is a protocol stack for control signal transmission.

Referring to FIGS. 2 and 3, the physical (PHY) layer provides an information transfer service to an upper layer using a physical channel. The physical channel is connected to an Medium Access Control (MAC) channel, an upper layer, via a transport channel. Data flows between the MAC layer and the physical layer through the transport channel. The transport channel is divided depending on characteristics in which data is transmitted through a radio interface.

Data flows through the physical channel between different physical layers, i.e., between the physical layer of a transmitter and the physical layer of a receiver. The physical channel may be modulated in the Orthogonal Frequency Division Multiplexing (OFDM) scheme and uses time and frequency as radio resources.

The functions of the MAC layer include mapping between the logical channel and the transport channel and multiplexing/de-multiplexing to a transport block provided through the physical channel over the transport channel of an MAC Service Data Unit (SDU) belonging to the logical channel. The MAC layer provides services to the Radio Link Control (RLC) layer through the logical channel.

The functions of the RLC layer include concatenation, segmentation and reassembly of the RLC SDU. To guarantee various Quality of Service (QoS) demanded by a radio bearer (RB), the RLC layer provides three operation modes including a transparent mode (TM), an unacknowledged mode (UM), and an acknowledged mode (AM). The AM RLC corrects errors through an Automatic Repeat Request (ARQ).

In the user plane, the functions of the PDCP (Packet Data Convergence Protocol) layer include transfer of user data, header compression, and ciphering. In the user plane, the functions of the Packet Data Convergence Protocol (PDCP) layer include transfer, and ciphering/integrity protection of the control plane data.

The Radio Resource Control (RRC) layer is defined only in the control plane. The RRC layer is associated with configuration, re-configuration, and release of radio bearers (RBs) and is in charge of control of the logical channel, transport channel, and physical channel. The RB means a logical path provided by the first layer (PHY layer) and the second layer (MAC layer, RLC layer, and PDCP layer) for data transfer between the user equipment and the network.

RB being configured means a process of specifying the characteristics of the radio protocol layer and channel and configuring each specific parameter and operation method so as to provide a specific service. The RB may be divided into two including an Signaling RB (SRB) and a Data RB (DRB). The SRB is used as a path for transmitting an RRC message on the control plane, and the DRB is used as a path for transmitting user data on the user plane.

If an RRC connection is established between the user equipment's RRC layer and the E-UTRAN's RRC layer, the user equipment is left in the RRC connected state, and the user equipment otherwise remains in the RRC idle state.

Downlink transport channels transmitting data from the network to the user equipment include a Broadcast Channel (BCH) transmitting system information and a downlink Shared Channel (SCH) transmitting other user traffic or control messages. Downlink multicast or broadcast service traffic or control messages may be transmitted through the downlink SCH or through a separate downlink Multicast Channel (MCH). Meanwhile, uplink transport channels transmitting data from the user equipment to the network include an Random Access Channel (RACH) transmitting initial control messages and an uplink Shared Channel (SCH) transmitting other user traffic or control messages.

As logical channels that are positioned over the transport channel and that are mapped to the transport channel, there are Broadcast Control Channel (BCCH), Paging Control Channel (PCCH), Common Control Channel (CCCH), Multicast Control Channel (MCCH), and Multicast Traffic Channel (MTCH).

The physical channel consists of several OFDM symbols in the time domain and a few sub-carriers in the frequency domain. One sub-frame is constituted of a plurality of OFDM symbols in the time domain. The resource block is a basis for resource allocation and consists of a plurality of OFDM symbols and a plurality of sub-carriers. Further, each sub-frame may use specific sub-carriers of specific OFDM symbols (e.g., first OFDM symbol) of the corresponding sub-frame for Physical Downlink Control Channel (PDCCH), i.e., L1/L2 control channel. Transmission Time Interval (TTI) is a basis time for sub-frame transmission.

An RRC state and an RRC connecting method of user equipment are hereinafter described in detail.

The RRC state means whether the RRC layer of user equipment is in logical connection with the RRC layer of E-UTRAN, and when connected, it is referred to as being in the RRC connected state, or unless connected, it is referred to as being in the RRC idle state. Since in the RRC connected state the user equipment has an RRC connection, E-UTRAN may grasp the existence of the corresponding user equipment on a per-cell basis and accordingly may effectively control the user equipment. On the contrary, the user equipment, when being in the RRC idle state, may not be grasped by E-UTRAN and is managed by a CN (Core Network) on the basis of a tracking area that is larger in area than the cell. That is, when the user equipment is in the RRC idle state, what is grasped on the user equipment is only whether the user equipment is existent or not on a per-large area basis, and for normal mobile services such as voice or data service to be provided, shift should be done to the RRC connected state.

When a user first powers on the user equipment, the user equipment initially explores a proper cell and then stays in the RRC idle state in the corresponding cell. The user equipment being in the RRC idle state establishes an RRC connection with the E-UTRAN through an RRC connection procedure when the user equipment needs to make an RRC connection and shifts to the RRC connected state. Examples of when the user equipment being in the RRC idle state needs to make an RRC connection include when uplink data transmission is required, e.g., due to a user's attempt to call or when transmitting a response message in response to receiving a paging message from the E-UTRAN.

The Non-Access Stratum (NAS) layer positioned over the RRC layer performs functions such as session management and mobility management.

To manage mobility of the user equipment in the NAS layer, two states, EPS Mobility Management-REGISTERED (EMM-REGISTERED) and EMM-DEREGISTERED, are defined, and these two states apply to the user equipment and the MME. Initially, the user equipment is in the EMM-DEREGISTERED state, and the user equipment performs a process of registering itself to the corresponding network through an initial attaching procedure so as to be attached to the network. If the attaching procedure is successfully done, the user equipment and the MME turn into the EMM-REGISTERED state.

To manage signaling connection between the user equipment and the EPC, two states, EPS Connection Management (ECM)-IDLE state and ECM-CONNECTED state, are defined, and these two states apply to the user equipment and the MME. If the user equipment being in the ECM-IDLE state establishes an RRC connection with the E-UTRAN, the corresponding user equipment turns into the ECM-CONNECTED state. The MME being in the ECM-IDLE state, when establishing an S1 connection with the E-UTRAN, turns into the ECM-CONNECTED state. When the user equipment is left in the ECM-IDLE state, the E-UTRAN does not contain context information of the user equipment. Accordingly, the user equipment being in the ECM-IDLE state performs user equipment-based mobility-related procedure such as cell selection or cell reselection without the need of receiving a command from the network. In contrast, when the user equipment is left in the ECM-CONNECTED state, the user equipment's mobility is managed by a command from the network. In case the position of the user equipment when the user equipment is in the ECM-IDLE state is different from the position known to the network, the user equipment informs the position of the user equipment to the network through a tracking area update process.

Next, system information is described.

The system information includes necessary information of which the user equipment should be aware to access the base station. Accordingly, the user equipment should be receiving the whole system information before gaining access to the base station and should always have the up-to-date system information. The system information should be known to all user equipment in one cell, and thus, the base station periodically transmits the system information.

According to chapter 5.2.2. 3GPP TS 36.331 V8.7.0 (2009-09) "Radio Resource Control (RRC); Protocol specification (Release 8)", the system information is divided into Master Information Block (MIB), Scheduling Block (SB), and System Information Block (SIB). MIB allows the user equipment to be aware of physical configuration of the corresponding cell, for example, bandwidth. SB indicates transmission information of SIBs, for example, transmission period. SIB is an aggregate of system information relating to each other. For example, some SIB includes only information on the neighboring cell, and some SIB contains only information on the uplink radio channel used by the user equipment.

In general, services provided from the network to the user equipment may be classified into three types as follows. Further, depending on what services may be provided, the user equipment differently recognizes the type of cell. Service types are first described, followed by cell types.

1) limited service: this service provides an emergency call and an earthquake and Tsunami warning system (ETWS) and may provide it in an acceptable cell.

2) normal service: this service means a general purpose of public service and may be provided from a suitable or normal cell.

3) operator service: this service means a service for communication network service providers and this cell may be used only by a communication network service provider but not by a general user.

In connection with service types provided by cells, cell types may be classified as follows:

1) acceptable cell: cell in which the user equipment may receive limited services. This cell is not barred in the position of the corresponding user equipment and satisfies a cell selection standard of the user equipment.

2) suitable cell: cell in which the user equipment may receive a normal service. This cell satisfies conditions of the acceptable cell and simultaneously meets additional conditions. As the additional conditions, this cell should belong to Public Land Mobile Network (PLMN) to which the corresponding user equipment may be attached and the tracking area update process of the user equipment should not be barred from being carried out. If the corresponding cell is a CSG cell, the cell should be accessible cell to which the user equipment can access as a CSG member.

3) barred cell: this cell broadcasts information that the cell is a barred cell.

4) reserved cell: this cell broadcasts information that the cell is a reserved cell.

Measurement and measurement report are now described.

In the mobile communication system, supporting mobility by the user equipment is essential. Accordingly, the user equipment continuously measures the quality of a serving cell currently providing a service and the quality of a neighboring cell. The user equipment reports a measurement result to the network at a proper time and the network provides the optimal mobility to the user equipment through handover.

The user equipment, in order to provide information that may help a service provider to operate the network besides the purpose of supporting mobility, may perform a measurement of a specific purpose as configured by the network and may report a measurement result to the network. For example, the user equipment receives broadcast information of a specific cell determined by the network. The user equipment may report, to the serving cell, position identification information (e.g., tracking area code) of the position to which the specific cell belongs, and/or other cell information (e.g., whether Closed Subscriber Group (CSG) cell is a member).

The user equipment being on the move, when identifying through the measurement that the quality of a specific area is very poor, may report to the network the position information for the cells of poor quality and the measurement result. The network may be optimized based on the report of the measurement result of user equipment that helps operation of the network.

In a mobile communication system with a frequency reuse factor of 1, mobility is mostly achieved between different cells on the same frequency band. Accordingly, for insuring better mobility of the user equipment, the user equipment should be able to measure better the cell information and quality of neighboring cells having the same center frequency as the center frequency of the serving cell. As such, measurement on the cells having the same center frequency as the center frequency of the serving cell is referred to as intra-cell measurement. The user equipment performs the intra-cell measurement and reports a measurement result to the network at a proper time so that the goal of the corresponding measurement result may be achieved.

A mobile communication service provider may operate the network using a plurality of frequency bands. In case a communication system service is provided through a plurality of frequency bands, the user equipment should be able to conduct better measurement on the cell information and quality of neighboring cells having center frequencies different from the center frequency of the serving cell so as to guarantee the optimal mobility for the user equipment. As such, the measurement on cells having a different center frequency from the center frequency of the serving cell is referred to as inter-cell measurement. The user equipment should be able to perform the inter-cell measurement and should be able to report a measurement result to the network at a proper time.

In case the user equipment applies for measurement on a heterogeneous network, it may also conduct measurement on a cell in the heterogeneous network in accordance with a configuration of the base station. Such measurement on the heterogeneous network is referred to as inter-Radio Access Technology (RAT) measurement. For example, RAT may include UMTS Terrestrial Radio Access Network (UTRAN) and GSM EDGE Radio Access Network (GERAN) that follow the 3GPP standards and may also include CDMA2000 system following the 3GPP2 standards.

Hereinafter, a process of selecting a cell by the user equipment is described in detail with reference to 3GPP TS 36.304 V8.8.0 (2009-12) "User Equipment (UE) procedures in idle mode (Release 8)".

After the user equipment once selects some cell through a cell selection process, the strength or quality of signals between the user equipment and the base station may vary due to a change in mobility of the user equipment or radio environment. Accordingly, in case the quality of the selected cell is deteriorated, the user equipment may select another cell providing better quality. When selecting a cell again, the user equipment generally selects a cell providing better signal quality than that provided by the currently selected cell. Such process is referred to as cell reselection. The cell reselection process, in the point of view of quality of radio signals, basically aims to choose a cell providing the best quality to the user equipment.

Besides the point of view of quality of radio signals, the network may determine a priority per frequency and may provide the priority to the user equipment. The user equipment receives the priority and considers the priority in preference to the radio signal quality condition in the cell reselection process.

As such, there is a method of selecting or reselecting a cell depending on signal characteristics in the radio environment, and in selecting a cell for reselection when doing cell reselection, the following cell reselection methods may be present according to the RAT of the cell and frequency characteristics.

intra-frequency cell reselection: reselects a cell having the same center frequency and the same RAT as a cell where the user equipment is camping.

inter-frequency cell reselection: reselects a cell having the same RAT and a different center frequency from a cell where the user equipment is camping.

inter-RAT cell reselection: reselects a cell using a RAT different from a RAT where the user equipment is camping.

The cell reselection process is as follows.

First, the user equipment receives a parameter for cell reselection from the base station.

Second, the user equipment measures quality of a serving cell and a neighboring cell to make the cell reselection.

Third, the cell reselection is performed based on cell reselection criteria. The cell reselection criteria have the following characteristics in relation to the measurement of the serving cell and the neighboring cell.

The intra-frequency cell reselection is basically based on ranking. The "ranking" is a process of defining index values for evaluating cell reselection and numbering the cells according to size of the index values. The cell having the best index is often called "best ranked cell." Cell index values are values obtained by, as necessary, applying a frequency offset or cell offset to values measured on the corresponding cell by the user equipment.

The inter-frequency cell reselection is based on the frequency priority order provided by the network. The user equipment attempts to camp on the frequency having the highest frequency priority. The network provides a frequency priority order that is jointly applicable to all the user equipment in the cell through broadcast signaling and may provide a per-frequency priority to each user equipment through per-user equipment signaling (dedicated signaling).

For the inter-frequency cell reselection, the network may provide parameters (e.g., frequency-specific offset) used for cell reselection to the user equipment per frequency.

For the intra-frequency cell reselection or inter-frequency cell reselection, the network may provide the user equipment with a neighboring cell list (NCL) used for cell reselection. This NCL includes per-cell parameters (for example, cell-specific offset) used for cell reselection.

For the intra-frequency or inter-frequency cell reselection, the network may provide the user equipment with a cell reselection black list used for cell reselection. The user equipment may not perform cell reselection on the cells included in the black list.

Subsequently, ranking which is done during the course of cell reselection evaluation is described.

The ranking criterion used to provide a priority of a cell is defined in Equation 1:

$$R_S = Q_{meas,s} + Q_{hyst}, R_n = Q_{meas,n} - Q_{offset}$$

Here, Rs is a ranking criterion of a serving cell, Rn a ranking criterion of a neighboring cell, Qmeas,s a quality value measured on a serving cell by the user equipment, Qmeas,n a quality value measured on a neighboring cell by the user equipment, Qhyst a hysteresis value for ranking, and Qoffset an offset value between two cells.

In case of intra-frequency, when the user equipment receives an offset (Qoffset,n) between the serving cell and the neighboring cell, Qffoset=Qoffsets,n. And, when the user equipment does not receive Qoffsets,n, Qoffset=0.

In case of inter-frequency, when the user equipment receives an offset (Qoffsets,n) for the corresponding cell, Qoffset=Qoffsets,n+Qfrequency. And, when the user equipment does not receives Qoffsets,n, Qoffset=Qfrequency.

If the ranking criterion (Rs) of the serving cell and the ranking criterion (Rn) of the neighboring cell vary while they are similar to each other, such variation causes the ranking order to keep changing, so that the user equipment may alternately reselect the two cells. Qhyst is a parameter that provides a hysteresis in cell reselection to prevent the user equipment from making alternate reselection on the two cells.

The user equipment measures Rs of the serving cell and Rn of the neighboring cell according to the above equation and considers the cell having the largest ranking criterion value as the best ranked cell, reselecting this cell.

The above criteria show that the cell quality acts as the most critical criterion in cell reselection. If the reselected cell is not a suitable cell, the user equipment excludes the corresponding frequency or cell from the targets for cell reselection.

Serving cells may be divided into a primary cell and a secondary cell. The primary cell is a cell that operates at a primary frequency, performs an initial connection establishing process of user equipment, or initiates a connection reestablishing process or is a cell designated as the primary cell during the course of handover. The primary cell is also referred to as reference cell. The secondary cell operates at a secondary frequency, may be configured after RRC connection is established, and may be used to provide an additional radio resource. At least one primary cell is always set, and a secondary cell may be added/modified/released by upper layer signaling (e.g., RRC message).

The radio link failure is now described.

The user equipment continues to perform measurement so as to maintain the quality of a radio link with a serving cell providing a service to the user equipment. The user equipment determines whether the quality of the radio link with the serving cell is weakened so that communication is impossible. If it is determined that the quality of the current serving cell is too poor to allow communication to be continued, the user equipment determines that the radio link fails.

If it is determined that the radio link failures occurs, the user equipment gives up maintaining communication with the current serving cell, selects a new cell through cell selection (or cell reselection), and attempts to reestablish an RRC connection to the new cell.

Figure 4:
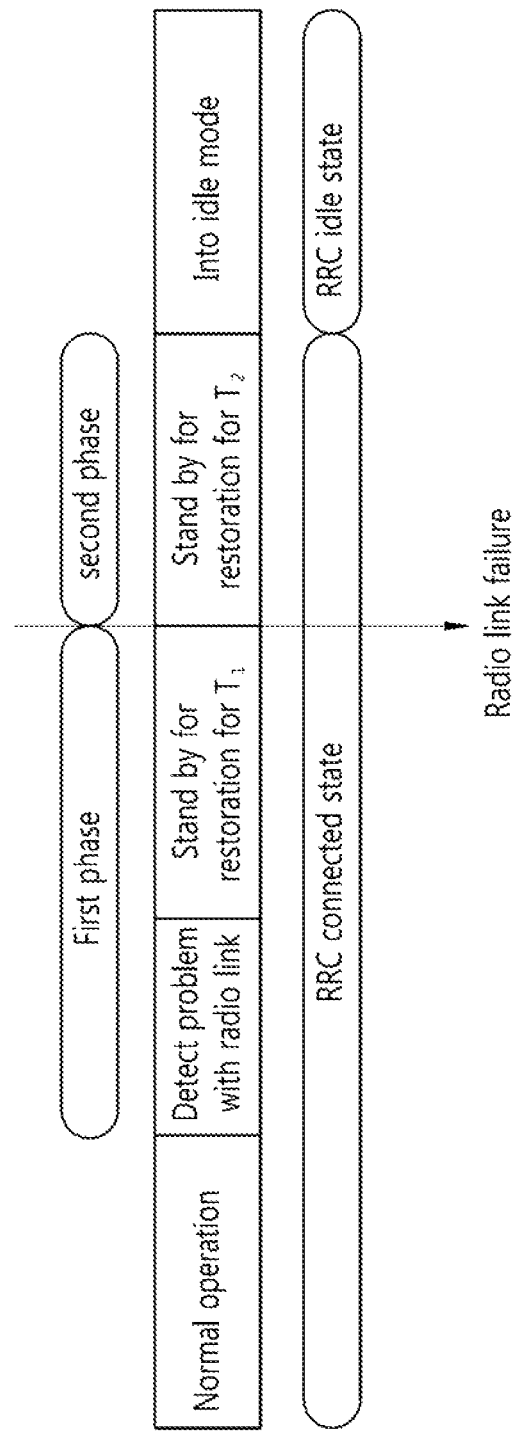
FIG. 4 is a view illustrating an example of a radio link failure.

FIG. 4 is a view illustrating an example of a radio link failure. The operation associated with the radio link failure may be described in two phases.

In the first phase, the user equipment normally operates and examines whether there is a problem with the current communication link. If a problem is detected, the user equipment declares "radio link problem" and stands by for first wait time T1 until the radio link is recovered. If the radio link is recovered before first wait time T1 elapses, the user equipment gets back to the normal operation. Unless the radio link recovers until the first wait time expires, the user equipment declares the radio link failure and enters into the second phase.

In the second phase, the user equipment stands by for second wait time T2 until the radio link recovers. If the radio link fails to recover until the second wait time expires, the user equipment enters into an RRC idle state or may perform an RRC reestablishing process.

The RRC connection reestablishing process is a process of reestablishing the RRC connection in the RRC_CONNECTED state. Because the user equipment remains in the RRC_CONNECTED state, that is, does not enter into the RRC_IDLE state, the user equipment does not initialize all of its radio configurations (e.g., radio bearer configuration, etc.). Instead, the user equipment temporarily pauses (suspends) use of all the radio bearers except for SRBO when starting the RRC connection reestablishing process. If the RRC connection reestablishing succeeds, the user equipment resumes use of the radio bearers that has been temporarily paused.

Figure 5:
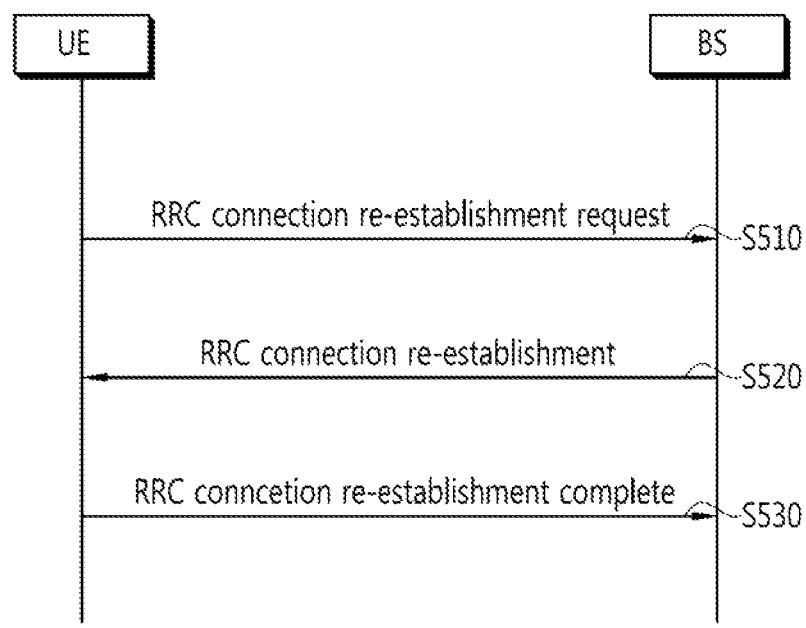
FIG. 5 is a flowchart illustrating a success of a connection reestablishing process.

FIG. 5 is a flowchart illustrating a success of a connection reestablishing process.

The user equipment performs cell selection and selects a cell. The user equipment receives system information to receive basic parameters for connection to the selected cell. The user equipment sends an RRC connection reestablishing request message to the base station (S510).

In case the selected cell is a cell having the context of the user equipment, that is, a prepared cell, the base station accepts the RRC connection reestablishing request from the user equipment and sends an RRC connection reestablishing message to the user equipment (S520). The user equipment forwards an RRC connection reestablishing complete message to the base station, thus leading the RRC connection reestablishing process to success (S530).

Figure 6:
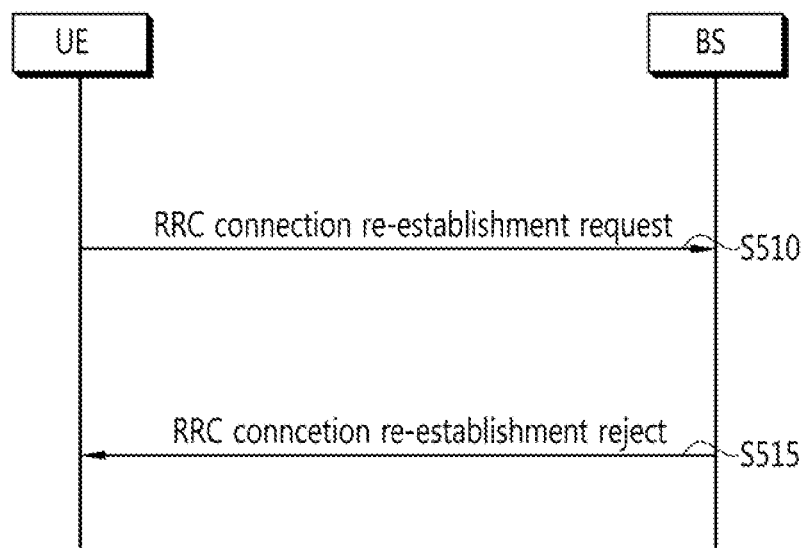
FIG. 6 is a flowchart illustrating a failure of a connection reestablishing process.

FIG. 6 is a flowchart illustrating a failure of a connection reestablishing process. The user equipment sends an RRC connection reestablishing request message to the base station (S510). If the selected cell is not the prepared cell, the base station sends an RRC connection reestablishing reject message to the user equipment in response to the RRC connection reestablishing request (S515).

ICIC (Inter-cell Interference Coordination) is now described.

ICIC is a task that operates radio resources to maintain control of inter-cell interference. The ICIC mechanism may be divided into frequency domain ICIC and time domain ICIC. ICIC includes multi-cell Radio Resource Management (RRM) functions that need consideration of information from the multi-cell.

An interfering cell is a cell that causes interference. The interfering cell is also referred to as aggressor cell.

An interfered cell is a cell that is interfered by the interfering cell. The interfered cell is also referred to as victim cell.

The frequency domain ICIC coordinates use of frequency domain resources (e.g., Resource Block (RB)) between multi-cells.

The time domain ICIC coordinates time domain resources (e.g., sub-frame) between multi-cells. For the time domain ICIC, OAM (Operations, Administration and Maintenance) configuration, which is called ABS (Almost Blank Subframe) pattern, may be used. In the interfering cell, the ABS is used to protect resources in the sub-frame of the interfered cell receiving strong inter-cell interference. The ABS is operated in the interfering cell, and the interfered cell utilizes the ABS for scheduling thereby coordinating interference from the interfering cell. The ABS is a sub-frame having reduced transmission power (or zero transmission power) over the physical channel or having decreased activity.

An ABS-based pattern is provided to the user equipment and restricts user equipment measurement. This is referred to as "measurement resource restriction." The ABS pattern refers to information indicating which sub-frame is ABS in one or more radio frames.

Depending on the measured cell (e.g., serving cell or neighboring cell) and measurement type (e.g., Radio Resource Management (RRM), Radio Link Monitoring (RLM), Channel State Information CSI)), three measurement resource restriction patters are present.

'ABS pattern 1' is used to restrict RRM/RLM measurement resources of the serving cell. Information on ABS pattern 1 may be provided from the base station to the user equipment when RB is configured/modified/released or when MAC/PHY configurations are modified.

'ABS pattern 2' is used to restrict RRM measurement resources of the neighboring cell operating at the same frequency as the serving cell. Accordingly, ABS pattern 2 may provide a list of neighboring cells to be measured, together with the pattern information, to the user equipment. ABS pattern 2 may be included in a measurement configuration for a measurement object.

'ABS pattern 3' is used to restrict resources for CSI measurement of the serving cell. ABS pattern 3 may be included in a message configuring CSI report.

For purposes of ICIC, two scenarios, CSG scenario and pico scenario, are being considered.

Figure 7:
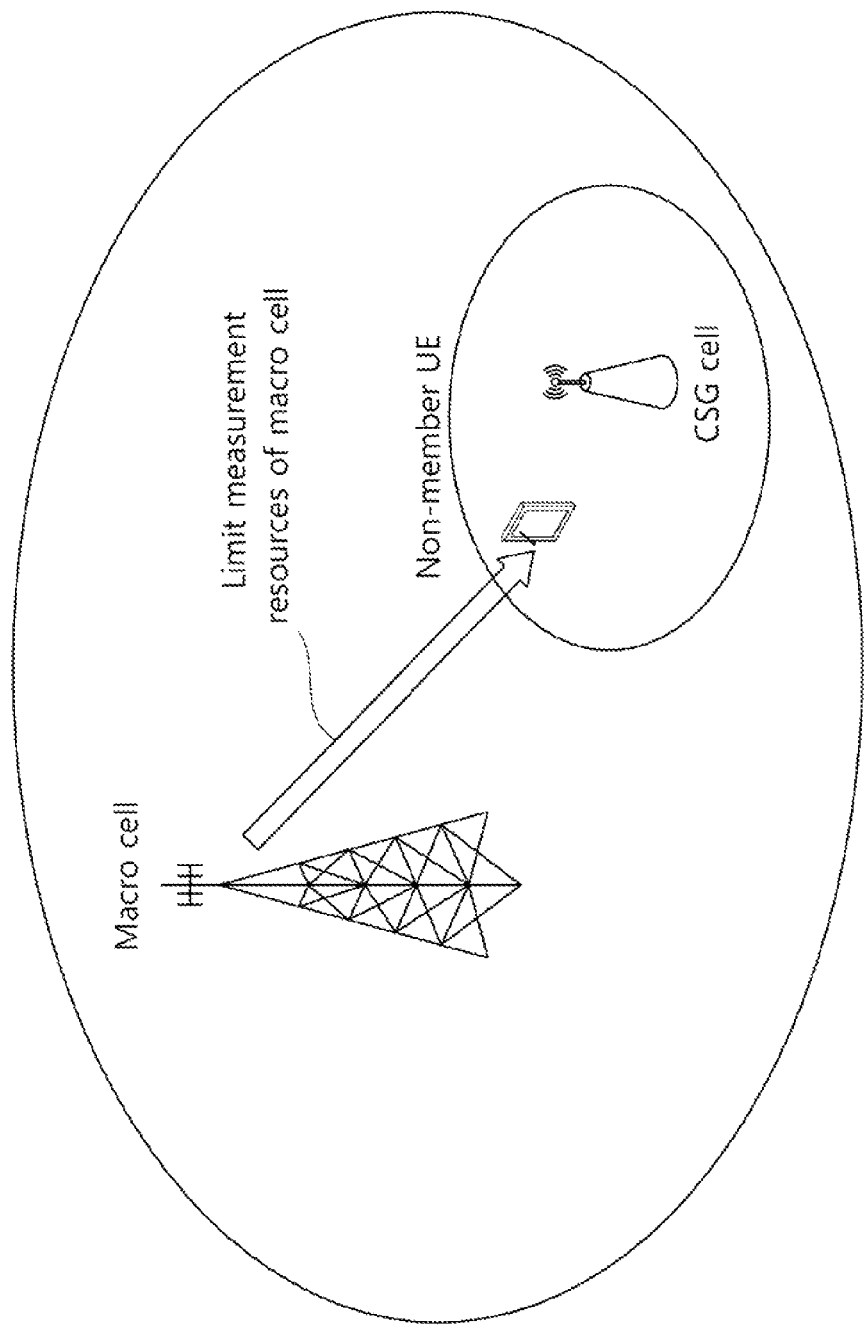
FIG. 7 shows an example of the CSG scenario.

FIG. 7 shows an example of the CSG scenario.

The CSG cell means a cell which only specific subscribers may access. The non-member user equipment is not a member of the CSG cell and is not allowed to access the CSG cell. A CSG cell that the user equipment cannot access is referred to as non-member CSG cell. The macro cell is a serving cell of non-member user equipment. The CSG cell wholly or partially overlaps the macro cell in light of coverage.

A main interference condition occurs when the non-member user equipment is positioned in close proximity to the CSG cell. In the point of view of the non-member user equipment, the CSG cell is an interfering cell, and the macro cell is an interfered cell. The time domain ICIC is used to allow the non-member user equipment to keep receiving a service in the macro cell.

In the RRC connected state, when finding that the non-member user equipment is under strong interference from the CSG cell, the network may configure a measurement resource restriction. Further, to facilitate mobility from the macro cell, the network may configure an RRM measurement resource restriction on the neighboring cell. If the user equipment is not strongly interfered from the CSG cell any more, the network may release the RRM/RLM/CSI measurement resource restrictions.

The user equipment may use a measurement resource restriction configured for RRM, RLM and CSI measurement. That is, the resources for RLM may be used in ABS, and measurement for RLM and CSI measurement may be conducted in the ABS.

The network may configure the CSG cell not to use low interference radio resources according to the configured measurement resource restriction. In other words, the CSG cell may not transmit or receive data in the ABS.

Figure 8:
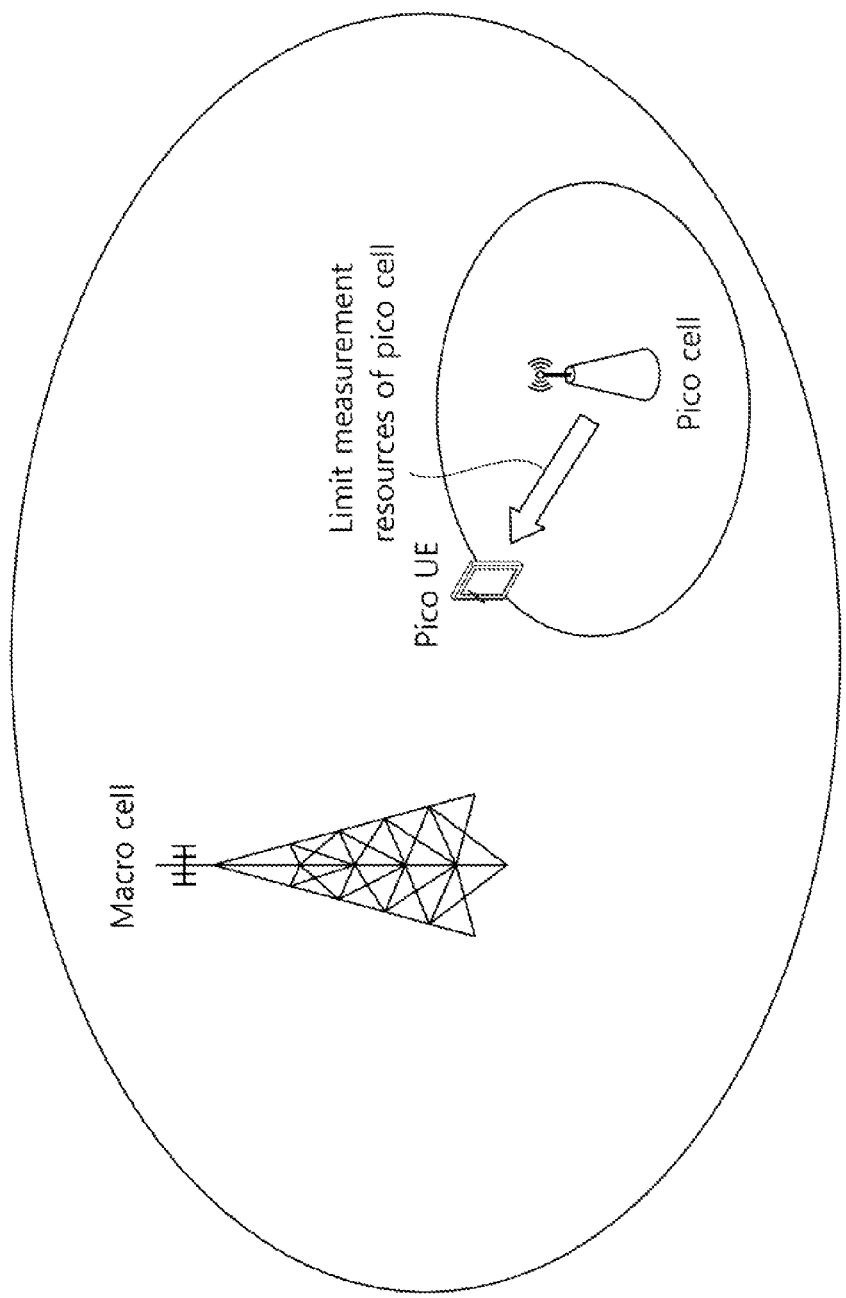
FIG. 8 shows an example of the pico scenario.

FIG. 8 shows an example of the pico scenario.

The pico cell is a serving cell of pico user equipment. The pico cell overlaps part or whole of the macro cell in light of coverage. The pico cell may generally have smaller coverage than that of the macro cell, but is not limited thereto.

A main interference condition takes place when the pico user equipment is placed at an edge of the pico serving cell. In the position of the pico cell, the macro cell is an interfering cell, and the pico cell is an interfered cell. The time domain ICIC is used for the pico cell to be able to keep receiving a service in the pico cell.

Upon finding that the pico user equipment is under strong interference from the macro cell, the pico cell may configure a measurement resource restriction on the corresponding user equipment.

The pico user equipment may use low interference radio resources based on the measurement resource restriction configured for RRM, RLM, and CSI measurement. In other words, the resources for RLM are used in the ABS, and measurement for RLM and CSI measurement may be conducted in the ABS. When the pico cell is strongly interfered by the macro cell, if the RRM/RLM/CSI measurement is fulfilled in the ABS, more correct measurement may be possible.

Further, if the user equipment using the macro cell as a serving cell performs measurement on the neighboring cell in the ABS, user equipment's mobility from the macro cell to the pico cell may be more easily done.

The user equipment performs RRM measurement such as Reference Signal Received Power (RSRP), Reference Signal Received Quality (RSRQ) and quality measurement such as Channel Quality Indicator (CQI) and path-loss measurement on the serving cell or neighboring cell. Further, the user equipment may conduct measurement objecting Radio Link Monitoring (RLM) to monitor connection with the serving cell.

Depending on an object the user equipment tries to perform measure on, a cell causing interference (interfering cell) and a cell damaged by the interference (victim cell) are determined.

In case the user equipment measures the serving cell, an intra-frequency neighboring cell having a strong signal, which is positioned near the user equipment, may act as interference in measuring the serving cell. In such case, the user equipment may be highly interfered by the neighboring cell in measuring the serving cell.

In case the user equipment measures an intra-frequency neighboring cell, signals from the serving cell and another intra-frequency neighboring cell may interfere with measurement on the intra-frequency neighboring cell. In such case, the user equipment may be highly interfered by the other neighboring cell having the serving frequency and the serving cell in measuring the neighboring cell.

In case the user equipment measures an inter-frequency neighboring cell, a signal from another neighboring cell having the corresponding frequency may act as interference to the measurement. In such case, the user equipment may be highly interfered by the other neighboring cell having the corresponding frequency in measuring the neighboring cell.

If the measurement object of the user equipment is under a highly interfered situation, the measurement may not be correctly done. In such situation, the network may configure a measurement configuration that fits for the interference situation for the user equipment so that right measurement may be achieved. However, under the situation where the serving cell of the user equipment is being highly interfered, it may be difficult for the network to transmit an optimal measurement configuration due to the interference. If the network wishes that the user equipment applies a normal measurement configuration under the situation where the measurement object is not highly interfered and that, under the situation where the measurement object of the user equipment is highly interfered, the user equipment applies another measurement configuration appropriate for such situation, the network is notified from the user equipment whenever the user equipment experiences the situation of being highly interfered and accordingly should change the measurement configuration. In such case, signaling overhead may be problematic.

To address such problems, a scheme needs in which if the user equipment detects the situation where the measurement object of the user equipment is severely interfered, the user equipment by itself varies the measurement configuration without a command from the network. Hereinafter, a method is suggested of determining that the user equipment is present in an area where high interference occurs and performing measurement using a measurement configuration in which the user equipment may autonomously avoid the interference.

In case the user equipment is positioned in an area where high interference is exerted, the user equipment may conduct measurement based on a second measurement configuration including measurement resource restriction information considering the corresponding interference. The second measurement configuration may be represented as a measurement resource restriction configuration. On the contrary, in case the user equipment is positioned in an area where high interference is not exerted, the user equipment may perform measurement based on a first measurement configuration including information for measurement pursuant to normal operation. The user equipment may detect whether high interference is exerted and may selectively use the measurement configurations.

When the first measurement configuration is necessary for normally operating user equipment to measure a measurement object, the second measurement configuration may be provided for a so-called restricted measurement in which the user equipment performs measurement considering radio resources further restricted as compared with the measurement configuration 1 as measurable radio resources with respect to the measurement object to which the second measurement configuration is to be applied.

The restricted radio resource may be a low radio resource where the object to be measured by the user equipment is less interfered when measurement is performed using the restricted radio resource. More specifically, the restricted radio resource may be given as an ABS pattern configured by an interfering cell with a time period when transmission from the cell causing the interference is minimized. The measurement resource restriction information may include ABS pattern information.

When the user equipment performs measurement, a measurement object to which the second measurement configuration is applied may be given to the user equipment in the form of a cell list or frequency list by the network.

The user equipment, before performing measurement based on the second measurement configuration, determines that the user equipment is positioned in an area where high interference is exerted and determines whether to use the second measurement configuration. Conditions for determining that the user equipment is positioned in the area where high interference is exerted may be as follow:

If the user equipment receives system information from a cell on which the user equipment has previously attempted to camp and determines, based on the system information, that the cell is an inaccessible cell, the user equipment stores the identification information (e.g., physical layer cell identity) of the corresponding cell. Thereafter, if the user equipment senses a cell having the same information as the identification information stored therein, the user equipment determines that the user equipment is now present in the highly interfered area.

If the user equipment receives system information from a cell on which the user equipment has previously attempted to camp and determines, based on the system information, that the cell is an inaccessible cell, the user equipment records its position. Thereafter, the user equipment compares its current position with the stored position, and if the user equipment is positioned near the inaccessible cell, the user equipment determines that the user equipment is currently positioned in the highly interfered area.

If the user equipment receives system information from a cell on which the user equipment has previously attempted to camp, determines based on the system information that the cell is an inaccessible cell, and the user equipment receives, from the cell, information on a specific time when low interference occurs from the cell, the user equipment stores the identification information (e.g., physical layer cell identity) of this cell and 'information on the specific time when low interference occurs' broadcast from the cell. The user equipment may store the position at this time. Thereafter, in case the user equipment senses a cell having the same identity as the stored identification information of the cell or determines that the user equipment is placed at the stored position, the user equipment determines that the user equipment is now positioned in a highly interfered area. The 'information on the specific time when low interference occurs' as stored by the user equipment is used as information constituting the second measurement configuration. The 'information on the specific time when low interference occurs' may be an ABS of a fempto cell.

If the user equipment receives a threshold value for determining that the user equipment is positioned in a cell area where interference occurs from the network and the quality of a neighboring cell measured by the user equipment is not less than the threshold value, the user equipment determines that the user equipment is positioned in the highly interfered area.

If the physical layer cell identity of the neighboring cell sensed by the user equipment is within a range of the physical layer cell identity reserved for CSG, the user equipment determines that the user equipment is positioned in the highly interfered area.

In case a difference between an RSRQ measured value and an RSRP measured value of the serving cell of the user equipment is not less than a threshold value, the user equipment determines that the user equipment is currently positioned in the highly interfered area.

If the measured value of the serving cell of the user equipment is not more than a threshold value, the user equipment determines that the user equipment is currently positioned in the highly interfered area.

In case the user equipment receives an indicator indicating that high interference may occur at a specific frequency or a measurement configuration for restricted measurement to be applicable to the specific frequency from the network, the user equipment, if happening to satisfy the conditions for measuring the specific frequency (e.g., when the quality of the serving cell drops to not more than an inter-frequency measurement threshold value so that the user equipment needs to start inter-frequency measurement), the user equipment determines that the user equipment is positioned in the highly interfered area in relation to the measurement of the frequency.

If the user equipment receives position/area information on a cell causing interference from the network, and then, the current position of the user equipment is determined to be positioned in a cell area causing interference, the user equipment determines that the user equipment is currently positioned in the interfered area.

According to an embodiment of the present invention, depending on a measurement method performed by the user equipment, the user equipment may determine that the user equipment is positioned in the highly interfered area only when among conditions for determining that the user equipment is positioned in the cell area causing interference, a plurality of conditions are met at the same time.

A cell that the user equipment cannot access may be a non-member CSG cell, for example, a non-member femto cell. As such, the cell that the user equipment cannot access may cause interference to the user equipment. The cell causing interference may be a pico cell or femto cell having even smaller coverage than the macro cell.

The above-described method of the user equipment determining a highly interfered area may be applicable to a method of performing measurement by the user equipment.

Hereinafter, a method of the user equipment determining an interference situation and selectively performing measurement based on a measurement resource restriction configuration is described. The measurement resource restriction information configured by an interfering cell that may cause high interference is assumed to be known to the serving cell through communication between base stations. It is also assumed that the measurement resource restriction information includes ABS pattern information and is transmitted in a second measurement configuration transmitted by the serving cell.

Figure 9:
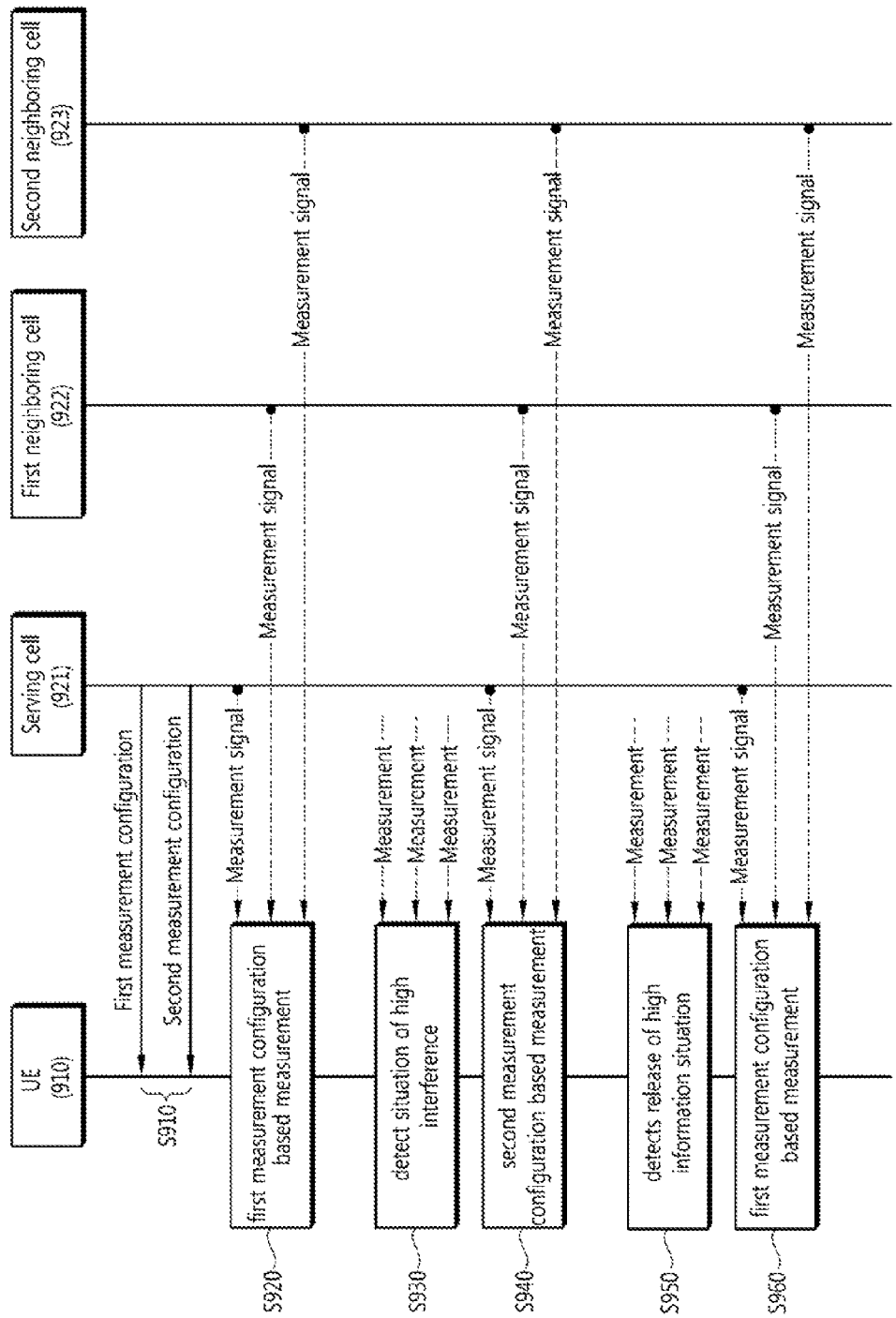
FIG. 9 is a view illustrating a measurement method by user equipment according to an embodiment of the present invention.

FIG. 9 is a view illustrating a measurement method by user equipment according to an embodiment of the present invention. The embodiment shown in FIG. 9 corresponds to a measurement method that may be applicable to intra-frequency measurement performed by the user equipment. It is assumed that the user equipment operates, connected to one serving cell and measures two neighboring cells other than the serving cell.

Referring to FIG. 9, the user equipment 910 receives a first measurement configuration and a second measurement configuration used for measuring the serving cell and the neighboring cell from the serving cell 921 (S910). The user equipment 910 may receive the first measurement configuration and the second measurement configuration through broadcast information or dedicated transmission information of the serving cell 921. The first and second measurement configurations are simultaneously transmitted, included in one broadcast information or dedicated transmission information transmitted from the serving cell 921 or may be transmitted at different times, respectively included in different broadcast information or dedicated transmission information. In such case, the second measurement configuration may be transmitted earlier than the first measurement configuration.

The user equipment 910, in the environment where no high interference occurs, measures measurement signals of the serving cell 921 and neighboring cells 922 and 923 based on the first measurement configuration.

The user equipment 910 detects a situation where a high interference occurs (S730). In this embodiment, the user equipment 910 may determine that high interference occurs in the second neighboring cell 922.

The user equipment 910, if detecting a situation where high interference occurs, performs measurement by applying the second measurement configuration (S940). Measurement on the neighboring cell as performed by the user equipment 910 applying the second measurement configuration may include RSRP measurement, RSRQ measurement and/or path-loss measurement. The measurement performed by the user equipment 910 applying the second measurement configuration includes measurement aiming RLM for monitoring connectivity with the serving cell.

The user equipment 910 detects that the situation where interference is occurring is released (S950).

The user equipment 910, when determining that no high interference occurs, performs measurement by applying the first measurement configuration (S960).

The network, upon transmitting the second measurement configuration to the user equipment, may also transmit a cell list to limit objects to which the second measurement configuration is to be applied. The user equipment receives the cell list and measures the cells included in the cell list based on the second measurement configuration while measuring the other cells based on the first measurement configuration. In the example illustrated in FIG. 9, if high interference is exerted to the second neighboring cell 923, and the second neighboring cell 923 is included in the cell list transmitted from the network, the user equipment 910 applies the first measurement configuration to measurement on the serving cell 921 and the first neighboring cell 922 and applies the second measurement configuration to measurement on the second neighboring cell 923.

The embodiment illustrated in FIG. 9 may be properly applicable to a case where the user equipment serviced from the macro cell is positioned near an edge of coverage of a pico cell installed in the coverage of the macro cell. The user equipment serviced from the macro cell which is a serving cell does not enter into the coverage of the pico cell which is a neighboring cell, but if positioned in the Cell Range Expansion (CRE), a signal from the serving cell is highly likely to cause high interference to measurement on the pico cell. In case the serving cell which is the interfering cell supports a measurement resource restriction configuration, the serving cell may provide the second measurement configuration including the measurement resource restriction information to the user equipment. The user equipment may perform measurement on the pico cell based on the second measurement configuration, and as necessary, the user equipment may conduct handover to the pico cell.

Figure 10:
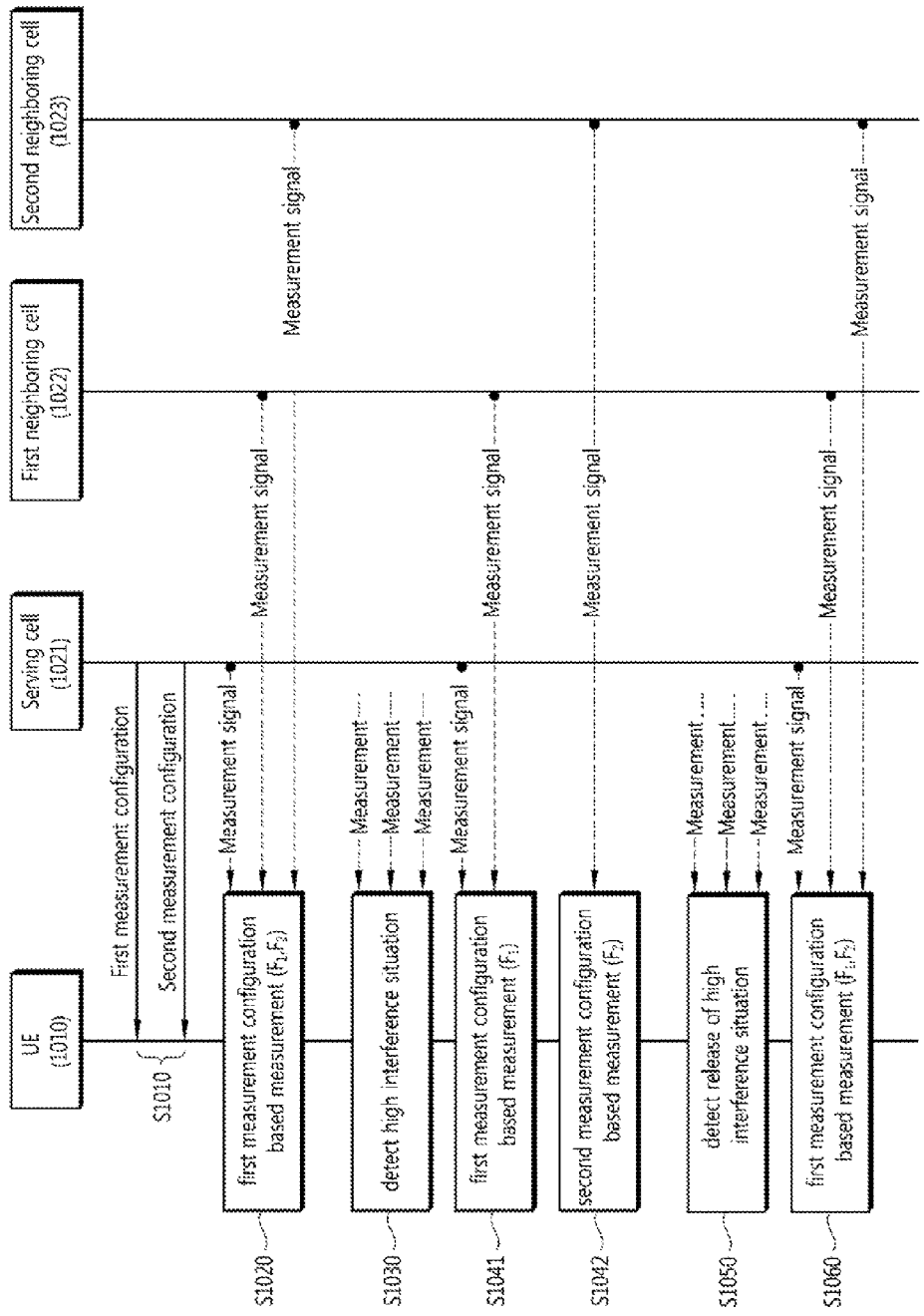
FIG. 10 is a view illustrating a method of performing measurement by user equipment according to another embodiment of the present invention.

FIG. 10 is a view illustrating a method of performing measurement by user equipment according to another embodiment of the present invention. The embodiment illustrated in FIG. 10 corresponds to a measurement method that may be applicable to inter-frequency measurement conducted by the user equipment. It is assumed that the user equipment is connected to one serving cell and operates and that the user equipment measures two neighboring cells in addition to the serving cell. It is also assumed that the serving cell and the first neighboring cell use a channel with the same center frequency F1, and the second neighboring cell uses a channel with a different central frequency F2.

Referring to FIG. 10, the user equipment 1010 receives a first measurement configuration and a second measurement configuration used for measuring the serving cell and the neighboring cell from the serving cell 1021 (S1010). The first measurement configuration includes measurement configuration information that may be applicable to a cell using F1 and a cell using F2. The second measurement configuration may include measurement configuration information that is to be applied when interference to the inter-frequency measurement, that is, interference is caused to the cell with frequency F2. For this purpose, the second measurement configuration may include information on a frequency list to which the corresponding measurement configuration applies.

The user equipment 1010 may receive the first measurement configuration and the second measurement configuration through broadcast information or dedicated transmission information of the serving cell 1021. The first measurement configuration and the second measurement configuration may be simultaneously transmitted, included in one broadcast information or dedicated transmission information transmitted from the serving cell 1021. The first measurement configuration and the second measurement configuration may be transmitted at different times, respectively included in different broadcast information or dedicated transmission information. In such case, the second measurement configuration may be transmitted earlier than the first measurement configuration.

The user equipment 1010 measures the serving cell 1021 and neighboring cells 1022 and 1023 based on the first measurement configuration in a communication environment where no high interference occurs (S1020). The serving cell 1021 and the first neighboring cell 1022 are cells using F1, and the second neighboring cell 1023 is a cell using F2, and thus, the user equipment 1010 may perform measurement based on the first measurement configuration.

The user equipment 1010 detects a situation where high interference occurs (S1030). In this embodiment, the user equipment 1010 may detect that high interference occurs in the second neighboring cell 1022.

When detecting that high interference occurs in the second neighboring cell 1023, the user equipment 1010 applies the first measurement configuration to measurement on the first neighboring cell 1022 and the serving cell 1021 with frequency F1 (S1041). On the contrary, the user equipment 1010 applies the second measurement configuration to measurement on the second neighboring cell 1023 with frequency F2 (S1042).

The user equipment 1010 detects that the situation where the interference is exerted is released (S1050). In this case, the user equipment 1010 detects that interference to the second neighboring cell 1023 with frequency F2 is released.

When detecting that the situation where high interference is exerted, the user equipment 1010 applies the first measurement configuration to measurement on the serving cell 1021, the first neighboring cell 1022, and the second neighboring cell 1023 (S1060). The measurement on the neighboring cell performed by the user equipment 1010 applying the second measurement configuration may include RSRP measurement, RSRQ measurement, and/or path-loss measurement. The measurement performed by the user equipment 1010 performing the second measurement configuration includes measurement aiming RLM for monitoring connectivity with the serving cell.

Meanwhile, the second measurement configuration may be received from the neighboring cell. For example, the user equipment serviced in the macro cell may be highly interfered by an inaccessible cell (e.g., non-member CSG, or non-member femto cell) installed in the coverage of the macro cell. In case the cell causing interference is a femto cell, since no X2 interface is installed between the femto BS and the macro BS, the macro BS may not obtain the second measurement configuration information including ABS configured by the femto cell. In such case, a scheme may be suggested in which the first measurement configuration for a neighboring cell accessible to the serving cell is obtained from the macro cell, and the second measurement configuration for a neighboring cell inaccessible to the serving cell is obtained from the cell causing interference.

Figure 11:
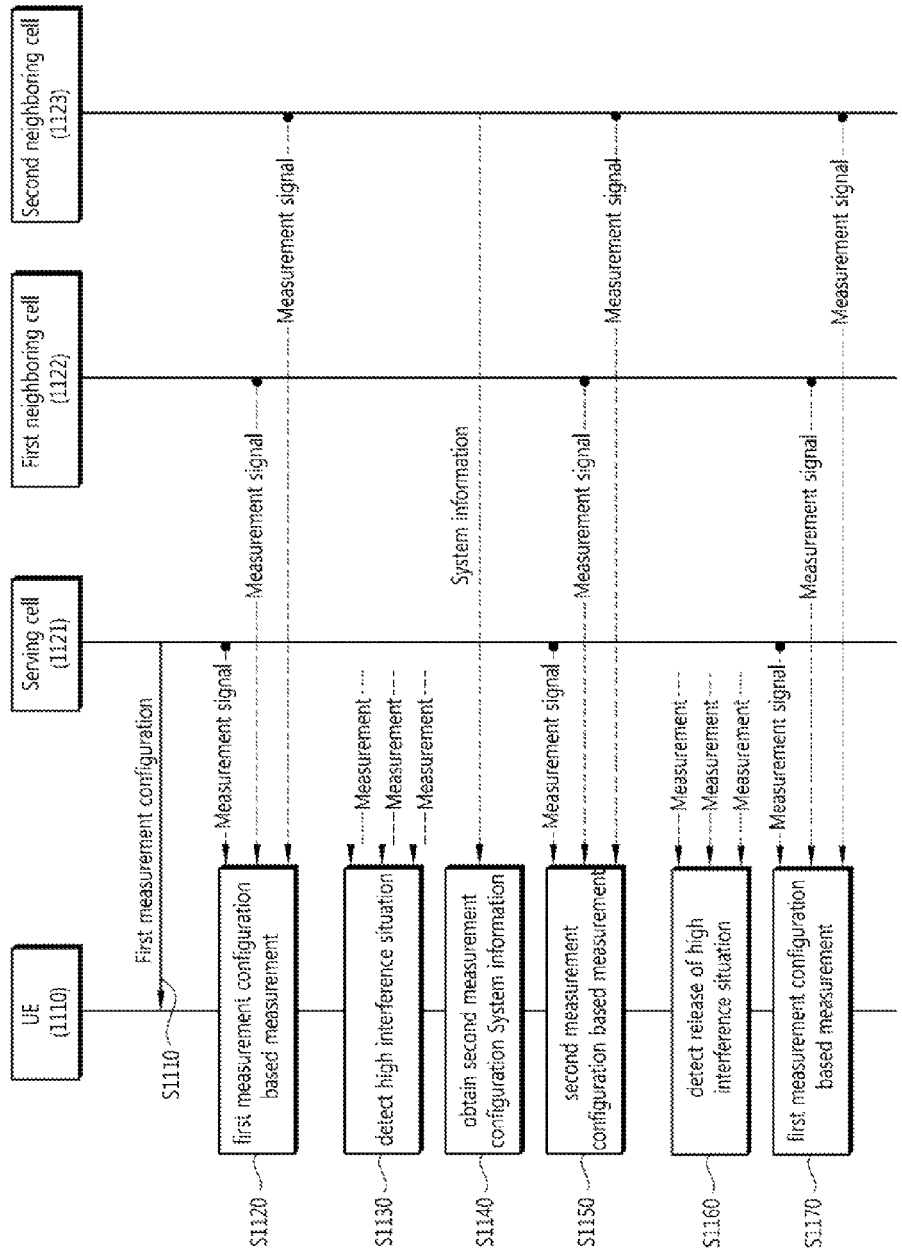
FIG. 11 is a view illustrating a method of performing measurement by user equipment according to another embodiment of the present invention.

FIG. 11 is a view illustrating a method of performing measurement by user equipment according to another embodiment of the present invention. The embodiment illustrated in FIG. 11 corresponds to a measurement method that may be applicable to intra-frequency measurement performed by the user equipment. It is assumed that the user equipment measures two neighboring cells in addition to a serving cell. The second neighboring cell is assumed to be a cell causing interference.

Referring to FIG. 11, the user equipment 1110 receives a first measurement configuration used for measuring the serving cell and neighboring cell from the serving cell 1121 (S1110). The user equipment 1110 may receive the first measurement configuration through the broadcast information or dedicated transmission information of the serving cell 1121.

The user equipment 1110 measures the serving cell 1121 and the neighboring cells 1122 and 1123 based on the first measurement configuration in a communication environment where no high interference occurs (S1120).

The user equipment 1110 detects a situation where high interference occurs (S1130). In this embodiment, the user equipment 1110 may detect that high interference occurs in the second neighboring cell 1122.

The user equipment 1110 obtains a second measurement configuration from the second neighboring cell 1123 that is the interfering cell (S1140). The second measurement configuration may be transmitted, included in system information broadcast by the second neighboring cell 1123. The second measurement configuration may include measurement resource restriction information configured by the second neighboring cell.

The user equipment 1110 measures the first neighboring cell 1122 and the second neighboring cell 1123 by applying the second measurement configuration (S1150). The measurement on the neighboring cell by the user equipment 1110 applying the second measurement configuration may include RSRP measurement, RSRQ measurement, and/or path-loss measurement. The measurement performed by the user equipment 1110 applying the second measurement configuration includes measurement aiming RLM for monitoring connectivity with the serving cell.

The user equipment 1110 detects that the situation where interference is exerted is released (S1160).

If detecting that the situation where high interference is exerted is released, the user equipment 1110 measures the serving cell 1121, the first neighboring cell 1122, and the second neighboring cell 1123 by applying the first measurement configuration (S1170).

In performing inter-frequency measurement, the user equipment may directly receive the second measurement configuration that is to be applied when detecting another cell causing high interference in measuring the other cell having the corresponding cell from the cell that may cause interference to the frequency. When sensing a neighboring cell causing interference at the corresponding frequency and obtaining second measurement configuration related information from the corresponding neighboring cell, the user equipment may apply the obtained second measurement configuration to measurement on the other cell. Further, if the situation where high interference occurs is released, the user equipment may get back to applying the first measurement configuration.

As described above with reference to the drawings, in case the user equipment autonomously applies the second measurement configuration to perform measurement and reports a result to the network, the user equipment may include, in the result of the measurement, information indicating that the measurement result is obtained based on the second measurement configuration.

The measurement method described above with reference to the drawings may include a case where a signal from the neighboring cell as measured by the user equipment is a transmission signal from a communication apparatus having wireless characteristics different from those of the serving cell, that is, the user equipment receives transmission signals from other RATs.

In the measurement method described above with reference to the drawings, an object deemed a neighboring cell signal measured by the user equipment may include a transmission signal from a communication apparatus (in-device other RAT) that are installed in the user equipment and that have wireless characteristics different from those of the serving cell of the user equipment. For example, it may be the case that signals from heterogeneous RATs such as wireless local area network or Bluetooth in the mobile device are measured by an LTE receiver in the mobile device. In such case, the restricted radio resources used for the user equipment to perform restricted measurement may be received from the serving cell or may have predetermined patterns of radio resources depending on RAT that is considered a neighboring cell by the user equipment.

As described above, the user equipment recognizes whether high interference occurs and as necessary autonomously selects and applies a measurement configuration. By doing so, the user equipment may perform restricted measurement. Since the user equipment by itself selectively uses a measurement configuration without separate signaling by the serving cell, the user equipment may perform restricted measurement even when high interference renders serving cell's signaling impossible. Further, such processes as the user equipment requesting a measurement configuration when high interference occurs—the base station responding to the request are skipped, thus preventing excessive occupation of radio resources.

Further, even while the serving cell is being interfered by other cells, the user equipment, through the restricted measurement, may maintain camping-on state in the serving cell without experiencing connection failure.

Even when the neighboring cell is being interfered by other cells, the user equipment may more correctly measure the neighboring cell through the restricted measurement in the form of fitting the purposes of operation of the network. Thus, network efficiency may be enhanced in terms of management of user equipment's mobility and utilization of radio resources.

Figure 12:
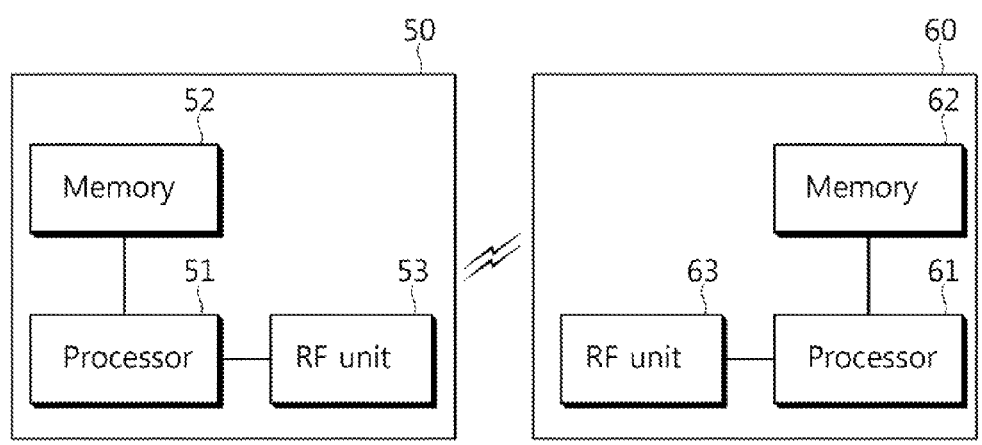
FIG. 12 is a block diagram illustrating a wireless communication system in which an embodiment of the present invention is implemented.

FIG. 12 is a block diagram illustrating a wireless communication system in which an embodiment of the present invention is implemented.

The base station 50 includes a processor 51, a memory 52, and an RF (Radio Frequency) unit 53. The memory 52 is connected to the processor 51 and stores various information for driving the processor 51. The RF unit 53 is connected to the processor 51 and transmits and/or receives radio signals. The processor 51 implements suggested functions, procedures, and/or methods. The operation of the base station 50 configuring a cell in the embodiments illustrated in FIGS. 7 to 9 may be implemented by the processor 51.

The user equipment 60 includes a processor 61, a memory 62, and an RF unit 63. The memory 62 is connected to the processor 61 and stores various information for driving the processor 61. The RF unit 63 is connected to the processor 61 and transmits and/or receives radio signals. The processor 61 implements suggested functions, procedures, and/or methods. The operation of the user equipment 60 in the embodiments illustrated in FIGS. 9 to 11 may be implemented by the processor 61.

The processor may include an ASIC (Application-Specific Integrated Circuit), other chipsets, logic circuits and/or data processing devices. The memory may include a ROM (Read-Only Memory), a RAM (Random Access Memory), a flash memory, a memory card, a storage medium and/or other storage devices. The RF unit may include a baseband circuit for processing radio signals. When the embodiments are implemented in software, the above-described schemes may be embodied in modules (procedures, functions, etc.) performing the above-described functions. The modules may be stored in the memory and may be executed by the processor. The memory may be positioned in or outside the processor and may be connected to the processor by various known means.

Although in the above-described exemplary systems, methods are described based on flowcharts including a series of steps or blocks, the present invention is not limited to the order of the steps, and some steps may be performed in a different order of other steps or simultaneously with other steps. It will be understood by one of ordinary skill that one or more steps in a flowchart may be deleted without affecting the scope of the invention.

The invention claimed is:

1. A method of performing measurement by user equipment in a wireless communication system, the method comprising:
   receiving, from a serving cell, a first measurement configuration applied to the measurement upon normal operation;
   receiving, from an interfering cell, a second measurement configuration applied to the measurement when high interference occurs;
   determining whether the high interference occurs; and
   performing the measurement based on a result of determining whether the high interference occurs, the first measurement configuration, and the second measurement configuration,
   wherein the second measurement configuration includes
      a list of measurement object cells to which the second measurement configuration applies,
      a frequency list of measurement object cells to which the second measurement configuration applies, or
      pattern information of an Almost Blank Subframe (ABS) that is a section where radio signal transmission by the interfering cell is minimized.

2. The method of claim 1, wherein performing the measurement comprises, when the high interference occurs, measuring the serving cell and a neighboring cell including the interfering cell based on the second measurement configuration.

3. The method of claim 2, wherein when the high interference does not exist, the serving cell and the neighboring cell including the interfering cell are measured based on the first measurement configuration.

4. The method of claim 3, further comprising reporting the measurement result to the serving cell, wherein if the measurement is performed based on the second measurement configuration, the measurement result includes information indicating that the measurement result is obtained based on the second measurement configuration.

5. The method of claim 1, wherein performing the measurement comprises, if the high interference occurs, measuring measurement object cells in the cell list based on the second measurement configuration, and measuring measurement object cells that are not included in the cell list based on the first measurement configuration.

6. The method of claim 1, wherein performing the measurement comprises, if the high interference occurs, measuring a measurement object cell using a frequency included in the frequency list based on the second measurement configuration and measuring a measurement object cell using a frequency that is not included in the frequency list based on the first measurement configuration.

7. The method of claim 1, determining whether the high interference occurs comprises, when detecting a cell having the same identification information as identification information of a cell determined to be an inaccessible cell, determining that the high interference occurs.

8. The method of claim 7, wherein determining whether the high interference occurs further comprises, when detecting the cell determined to be an inaccessible cell and a position of the user equipment and a current position of the user equipment are within a predetermined distance, determining that the high interference occurs.

9. The method of claim 8, wherein determining whether the high interference occurs further comprises, if a value measured on the neighboring cell by the user equipment is not less than a predetermined first threshold value, determining that the high interference occurs.

10. The method of claim 9, wherein determining whether the high interference occurs further comprises, if a physical layer cell identity of the neighboring cell is an identity reserved for a CSG (Closed Subscriber Group), determining that the high interference occurs.

11. The method of claim 10, wherein determining whether the high interference occurs further comprises, if a difference between an RSRP measured value and an RSRQ measured value of the serving cell is not less than a predetermined second threshold value, determining that the high interference occurs.

12. The method of claim 11, wherein determining whether the high interference occurs further comprises, if a measured value of the serving cell is not more than another predetermined third threshold value, determining that the high interference occurs.

13. An apparatus of performing measurement in a wireless communication system, the apparatus comprising:
an RF (Radio Frequency) unit transmitting and receiving a radio signal; and
a processor connected to the RF unit and configured to:
receive, from a serving cell, a first measurement configuration applied to the measurement upon normal operation,
receive, from an interfering cell, a second measurement configuration applied to the measurement when high interference occurs,
determine whether the high interference occurs, and
perform the measurement based on a result of determining whether the high interference occurs, the first measurement configuration, and the second measurement configuration,
wherein the second measurement configuration includes
a list of measurement object cells to which the second measurement configuration applies,
a frequency list of measurement object cells to which the second measurement configuration applies, or
pattern information of an Almost Blank Subframe (ABS) that is a section where radio signal transmission b the interfering cell is minimized.

14. The apparatus of claim 13, wherein when the high interference occurs, the processor measures the serving cell and a neighboring cell including the interfering cell based on the second measurement configuration.

15. The apparatus of claim 14, wherein when the high interference does not exist, the processor measures the serving cell and the neighboring cell including the interfering cell based on the first measurement configuration.

* * * * *